United States Patent [19]

Muller et al.

[11] 4,239,174
[45] Dec. 16, 1980

[54] TWO STEP EJECTOR STRUCTURE FOR A MOLD FOR INJECTION MOLDING OR THE LIKE

[76] Inventors: Hans Muller, Femte Villagatan 12, 502 44 Boras; Nils G. Nilsson, Bergslanten, 520 15 Hokerum, both of Sweden

[21] Appl. No.: 94,126

[22] Filed: Nov. 14, 1979

[30] Foreign Application Priority Data

Nov. 14, 1978 [SE] Sweden .............................. 7811723

[51] Int. Cl.² .......................... B29C 7/00; B29F 1/14
[52] U.S. Cl. ........................................ 249/67; 249/59; 425/436 R; 425/438; 425/DIG. 58
[58] Field of Search .......................... 249/67, 68, 59; 425/436, 438, 444, DIG. 58

[56] References Cited

U.S. PATENT DOCUMENTS

| | | | |
|---|---|---|---|
| 3,125,801 | 3/1964 | Fields | 249/68 X |
| 3,433,450 | 3/1969 | Brunner et al. | 249/67 |
| 3,479,698 | 11/1969 | Shaughnessy | 249/68 X |
| 3,516,302 | 6/1970 | Mixttart | 249/68 X |
| 3,660,001 | 5/1972 | Roehr | 425/438 X |
| 3,718,415 | 2/1973 | De Felice | 249/68 X |
| 3,737,268 | 6/1973 | Ryder | 249/68 X |
| 3,844,703 | 10/1974 | Hütter | 425/444 X |
| 3,940,103 | 2/1976 | Hilaire | 249/59 X |
| 3,986,805 | 10/1976 | Haines | 249/68 X |
| 4,019,711 | 4/1977 | Altenhof et al. | 249/68 X |
| 4,050,666 | 9/1977 | Van Tichelt | 249/68 |

Primary Examiner—J. Howard Flint, Jr.
Attorney, Agent, or Firm—William A. Drucker

[57] ABSTRACT

A two-step ejector structure for molds for injection molding and the like has a first ejector member arranged to be directly acted upon for ejection and to act upon an ejector pin carrier which is to be displaced in the first and second ejector steps, and a second ejector member acting upon a second ejector pin carrier which is to be displaced only in the first ejector step, and a coupling to accomplish the movement of the second ejector member during a predetermined first portion of the ejector movement of the first ejector member and thereafter release the first ejector member from the second ejector member and lock the second ejector member to a member securely connected to a tool.

5 Claims, 5 Drawing Figures

TWO STEP EJECTOR STRUCTURE FOR A MOLD FOR INJECTION MOLDING OR THE LIKE

BACKGROUND OF THE INVENTION

Some molds for injection molding need ejectors working in two steps. This is the case for example when using molds to produce articles having undercuts. In this case, the first part of the ejecting movement is used to laterally move the parts of the mold which provide the undercuts of the article, and not until the end of the ejecting movement is the actual ejecting of the article from the mold accomplished.

OBJECT OF THE INVENTION

Today a simple and effective ejector structure of said type is lacking, and the main object of the present invention is thus to eliminate said shortage.

SUMMARY OF THE INVENTION

To accomplish this and other purposes, the ejector structure according to the invention is constructed according to the appended claims.

BRIEF DESCRIPTION OF THE DRAWINGS

The accompanying drawings illustrate an exemplifying embodiment of the invention.

In the drawings:

FIG. 4 is a sectional view on a larger scale through the portion of the ejector structure encircled in FIG. 1 and, FIG. 5 is an end view of a ring 11 connected to the injection mold.

DESCRIPTION OF THE PREFERRED EMBODIMENT

Figure 1:
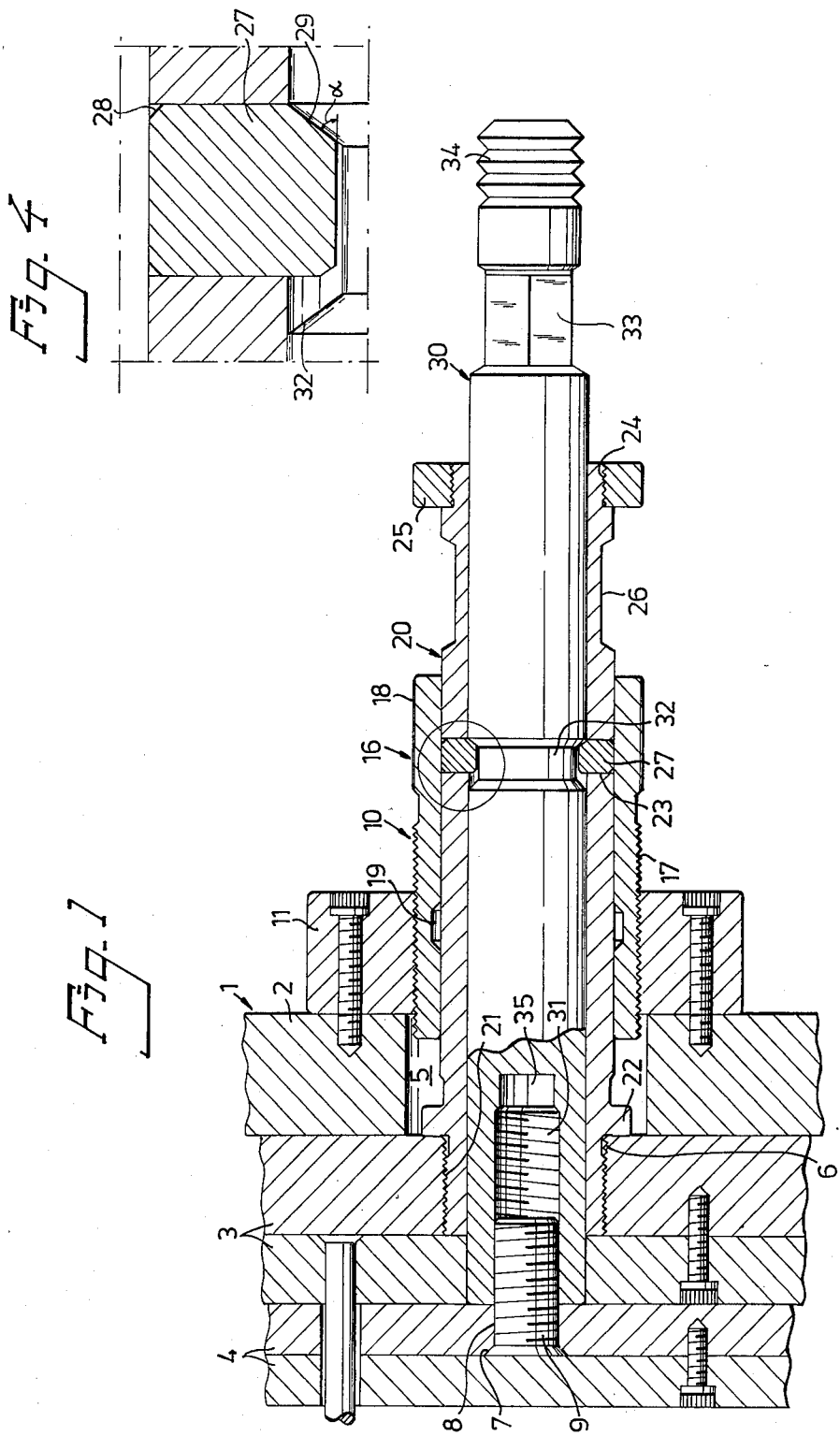
FIG. 1 is a longitudinal section through the ejector structure in an initial position before performing the ejecting step, the ejector pin plates being in their retracted position.

The drawing illustrates the rear portion of a mold for injection molding generally designated by reference numeral 1. The illustrated portion comprises a rear attachment plate 2 of the mold and first and second ejector pin plates 3 and 4, respectively. The purpose of the ejector pin plates is to hold ejector pins and similar means and to move them. Each one usually comprises two plates fastened to each other to clamp therebetween heads of the ejector pins, as will be seen in the drawing.

The attachment plate preferably has a central through opening 5, and one of the ejector pin plates 3 similarly has a preferably central threaded opening 6, and one plate of the ejector pin plates 4 has a hole 8 provided with a chamfered entrance 7 to hold a threaded pin 9 in a manner to be seen in FIG. 1. The parts of the ejector pin plates are connected to each other by means of bolts or screws.

The ejector structure is designated as a whole by reference numeral 10. Said ejector device comprises a ring 11 attached to the rear attachment plate 2 of the mold by means of screws 12, according to FIG. 5, and has an internal threading 13. The ring has a slit 14 and by means of a bolt 15 the legs so defined may be forced towards each other for a purpose to be disclosed.

The ejector structure also has an adjustment sleeve 16 provided with an external thread 17 to engage the threading 13 of the ring 11. The adjustment sleeve preferably also has a knurled portion 18 and is internally provided with a circumferential profiled groove 19. An ejector sleeve 20 is displaceably mounted in the adjustment sleeve 16, and one end of the said ejector sleeve has an external threading 21 to engage the internal threading 6 of the ejector pin plate 3. The extent of threading into the ejector pin plate 3 is limited by a flange 22. Further, the ejector sleeve 20 has a number of rectangular holes 23, the purposes of which are to be described. The ejector sleeve has in the end thereof, opposite to the threading 21, a threading 24 bounded by a flange and intended to engage a corresponding threading of an abutment ring 25 which serves to axially limit the displacement movement of the ejector sleeve to the left, as seen in the drawing, by abutting the right-hand end of the adjustment sleeve 16.

Coupling sections 27 are inserted in the rectangular holes 23 of the ejector sleeve. The sections are shown on a larger scale in FIG. 4. As will be especially clearly seen in FIG. 4 the edges of the sections are bevelled at 28. The portions extending towards the central part of the ejector sleeve, as may be seen in FIG. 4, have oblique surfaces 29 the angle $\alpha$ of which exceeds 45° for a purpose to be disclosed.

The ejector according to the present invention also comprises an ejector pin 30 having an internal threading 31 in the left hand end thereof, according to the drawing. The threading is provided to engage the threadings of the pin 9. The ejector pin has a circumferential profiled groove 32 (see also FIG. 4) intermediate the ends thereof. The ejector pin has a key grip 33 adjacent the right hand end thereof, as seen in the drawing, and the right hand end thereof may have means 34 for connection to an ejector-mechanism. However, it should be noted that the ejector may also be used without the aid of any special ejector-mechanism, in that the ejector pin upon the opening of the mold simply engages a stationary part provided in the injection molding machine.

The structure described is easily mounted onto an injection mold by tightening the ring 11 to the rear attachment plate thereof, and by tightening the ejector pin by means of a key gripping the key grip 33 onto the pin 9. The stroke may be varied by turning the adjustment sleeve 16 in relation to the ring 11 when the bolt 15 is loosened and permits such a turning action. The position is thereafter fixed by tightening the bolt 15.

Figure 2:
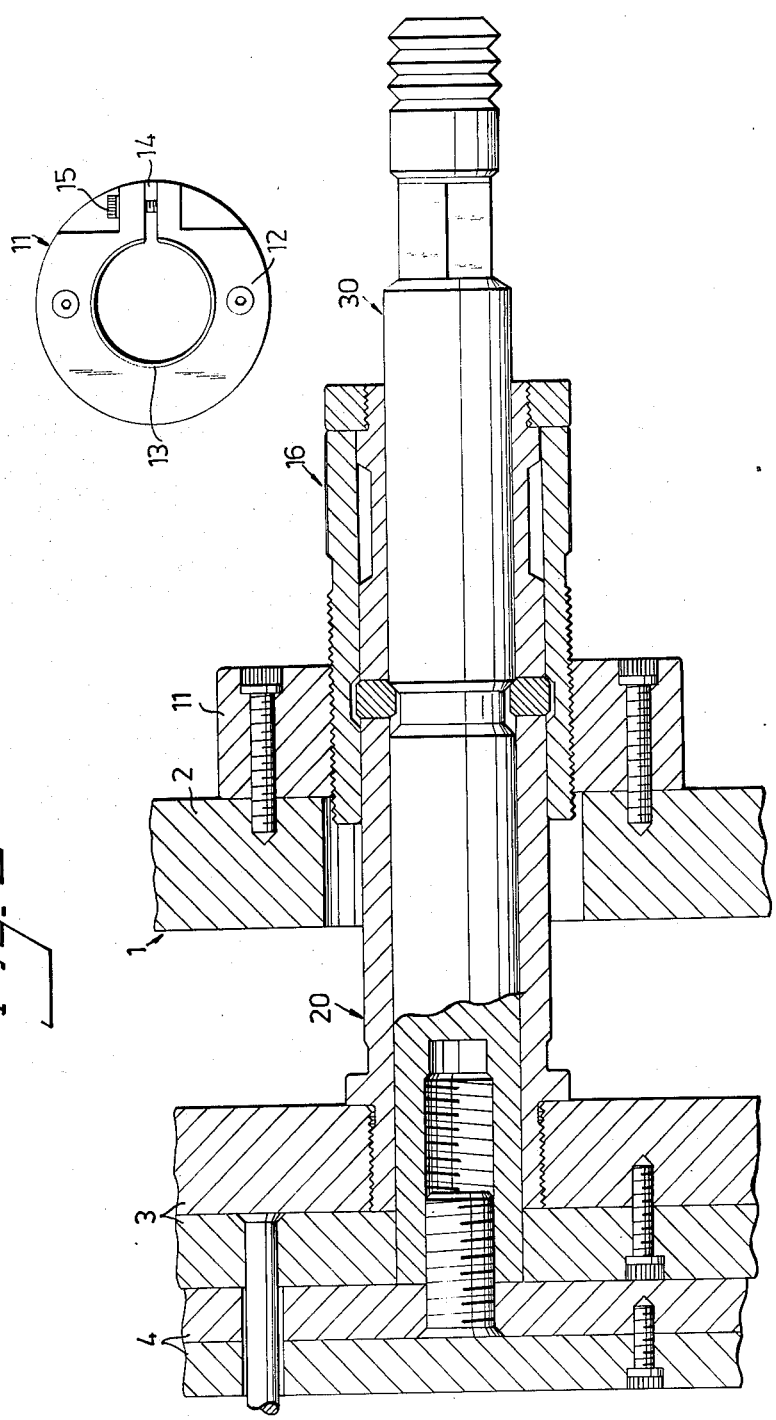
FIG. 2 is a longitudinal section through the ejector structure in a position where one of the ejector pin plates has reached one end position thereof.

The ejector structure operates in the following manner:

When the ejector pin 30 moves to the left in FIG. 2 during the ejection movement, it is usually the tool that moves, whereas the ejector pin, after having engaged for example the stationery part, mentioned above, is not moving. However, for reasons of clarity the movements of the ejector pin are referred to and these must be considered as relative. The ejector pin plate 4 connected thereto will naturally take part in said movement. Since the ejector sleeve 20 is connected to the ejector pin by means of the coupling sections 27, and said sections may not be pushed out of engagement with the ejector pin 30, consequently also the ejector sleeve 20, and also the ejector pin plate 3 connected thereto, will take part in the movement of the ejector pin. It is understood that the oblique surface, limiting the groove 32 by engagement with the oblique surface 29 of each coupling section respectively, subjects this section to a force tending to press it towards the inner surface of the adjustment sleeve 16. In order that said force may not be unpermissably large, the angle α is relatively large.

During said part of the ejecting movement, the ejector pin plates 3 and 4 have been displaced in an exial direction. However, a change takes place when the ejector pin has reached the position illustrated in FIG. 2, in which position the groove 19 of the adjustment sleeve registers with the corresponding groove 32 in the ejector pin. In this position obviously the coupling sections 27 may be pushed out to such an extent, in relation to the ejector sleeve 20, that they leave the grip with the ejector pin. Thus, the coupling sections are outwardly displaced in a radial direction by means of the oblique surfaces 29 so that they will be located in the adjustment sleeve and the ejector sleeve rather than in the ejector pin and the ejector sleeve. As soon as this is accomplished, and the ejector pin continues the forward movement thereof, the ejector sleeve is secured in the position illustrated in FIG. 2, which is determined by the abutment ring 25 and by the position of the groove 19. As may be seen in FIG. 2, an accurate axial securing of the ejector sleeve is obtained despite that the groove 19 is considerably wider than each coupling section, respectively.

Figure 3:
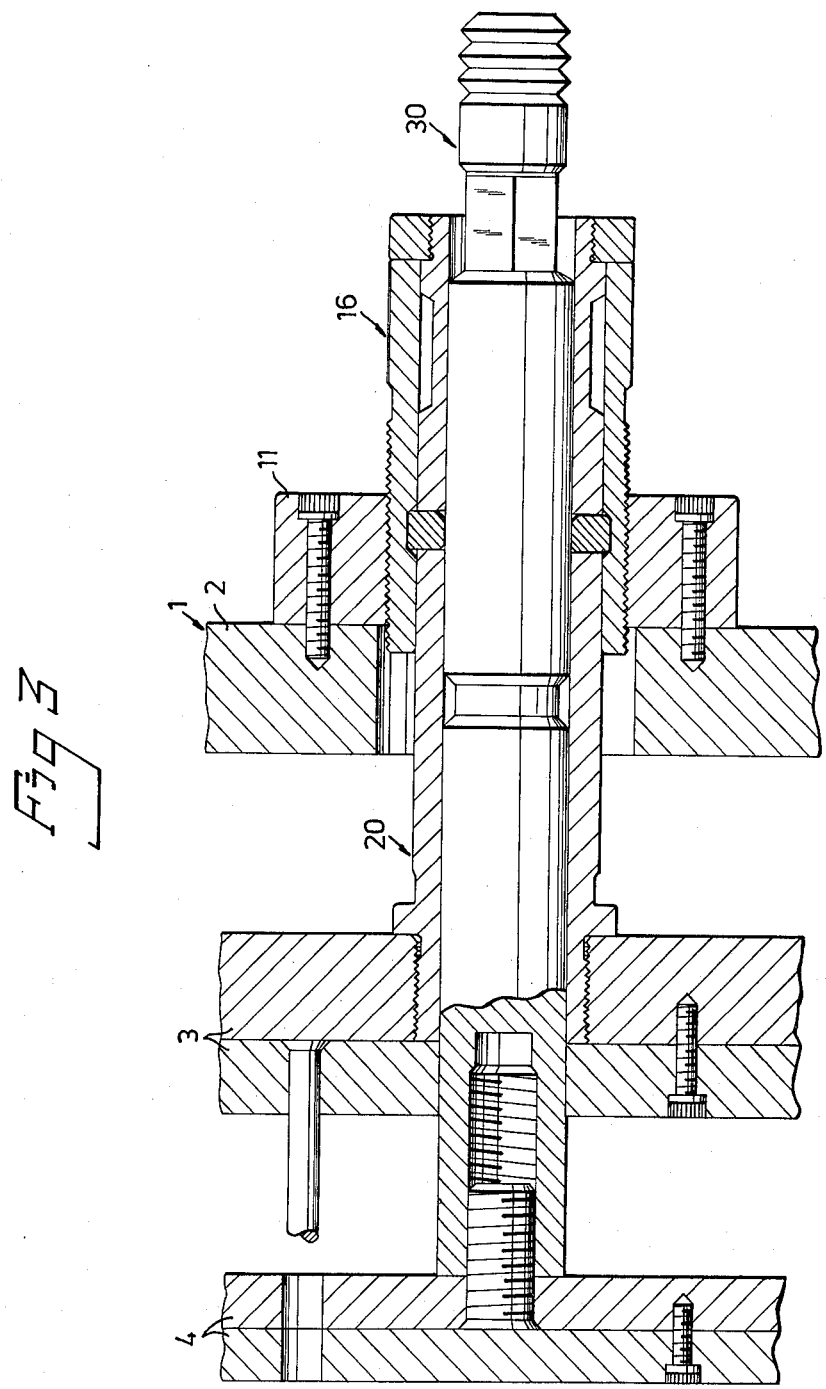
FIG. 3 shows in a similar longitudinal section the ejector structure in a position wherein the second ejector pin plate has also reached one end position thereof.

Thus, upon the continued forward movement of the ejector pin 30, the ejector pin plate 4 will also move, but the ejector pin plate 3 will remain in the position thereof illustrated in FIG. 2. The end position is shown in FIG. 3.

When the ejecting operation is complete, the parts return to the starting position according to FIG. 1.

As mentioned, the stroke may be varied by varying the extent of tightening the adjustment sleeve into the ring 11. Since the end surface of the adjustment sleeve 16 naturally moves as much as the groove 19 thereof, the above disclosed accurate axial securing of the ejector sleeve in relation to the adjustment sleeve will remain, independently of the position of the adjustment sleeve.

Two ejector pin plates have been described above, but it may be mentioned that one of the ejector pin plates may solely comprise a central ejector for the sprue, and also other combinations may be used. In order to make the ejector useable also in cases when one of the ejector pin plates comprises a pin, the ejector pin 30 according to the Figure is provided with a bore 35, suitably having a planar bottom in the extension of the threaded hole 31.

The invention may be varied within the scope of the appended claims.

We claim:

1. A two-step ejector structure for molds for injection molding and the like comprising, (i) a first ejector member to be directly acted upon for ejection and to act upon an ejector pin carrier which is to be displaced in the first and second ejector steps, and a second ejector member acting upon a second ejector pin carrier which is to be displaced only in the first ejector step and (ii) coupling means to accomplish the movement of said second ejector member during a predetermined first portion of the ejector movement of the first ejector member and thereafter release said first ejector member from said second ejector member and lock said second ejector member to a member securedly connected to a tool.

2. A two-step ejector structure according to claim 1, wherein the first ejector member is shaped as an ejector pin, and the second ejector member comprises a sleeve-shaped member displaceably located in relation to said pin, said sleeve member being displaceably mounted in relation to a sleeve attached to the mold, and wherein said coupling means comprise a profiled groove in said ejector pin a number of openings provided in the sleeve shaped member and radially running through the same, and coupling sections guided by said openings, said sections having such a radial extent that they project from or extend into said sleeve shaped member so that, alternatively, they may be inserted into said groove of the ejector pin or into a correspondingly shaped internal groove in the sleeve attached to the mold.

3. A two-step ejector structure, according to claim 2, wherein the sleeve may be adjusted, preferably by threading into a part of the injection mold.

4. A two-step ejector structure according to claim 2, wherein the coupling sections have oblique surfaces to engage corresponding oblique surfaces limiting the groove of the ejector pin.

5. A two-step ejector structure according to claim 2, wherein the sleeve shaped member has an abutment portion to engage a corresponding abutment surface of the sleeve in one end position of the sleeve shaped portion, wherein the position of said abutment portion is so selected that the groove of the sleeve will register with the coupling sections when the abutment portion is in said end position.

* * * * *